Aug. 20, 1957 G. F. WALES 2,803,152
METHOD OF MANUFACTURING A PERFORATING DIE
Filed March 8, 1952 3 Sheets-Sheet 1

INVENTOR.
George F. Wales
BY
Schlesinger
Attorney.

INVENTOR.
George F. Wales
BY
B. F. Schlesinger
Attorney.

Aug. 20, 1957  G. F. WALES  2,803,152
METHOD OF MANUFACTURING A PERFORATING DIE
Filed March 8, 1952  3 Sheets-Sheet 3
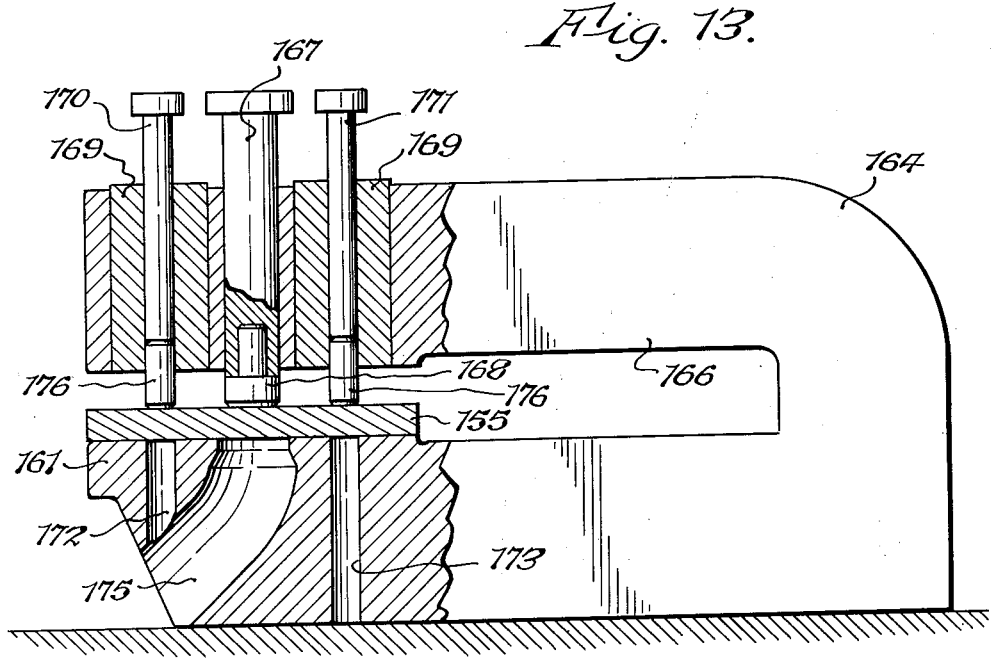
INVENTOR.
George F. Wales
BY
Attorney.

United States Patent Office 2,803,152
Patented Aug. 20, 1957

2,803,152

METHOD OF MANUFACTURING A PERFORATING DIE

George F. Wales, Kenmore, N. Y.

Application March 8, 1952, Serial No. 275,475

10 Claims. (Cl. 76—107)

The present invention relates generally to metal perforating tools and more particularly to a perforating die and to a method of manufacture of a die assemblage utilizing small sheet metal die elements.

Perforating devices of the type in which the perforating die of the present invention is intended to be used generally comprise large plates. The punch bits cooperate with a die element in the form of a large plate, and are guided with reference to the work and the die plate by a guide plate of large area. This type of apparatus is shown in my U. S. Patent No. 2,410,372, granted October 29, 1946. It is particularly advantageous for use in the production of aircraft and other similar short-run jobs in which the necessity for fast and economical tooling is a prerequisite.

The die plate itself is conventionally made of a single sheet of tool steel or of segmental tool steel plates. The guide plate may also be made of steel, but it can be made of some other suitable material such as plastic, since it is not subjected to cutting torques and strains. The die, however, has to be made of steel to withstand the cutting torques and shocks.

At the present time and in times of emergency, however, the supplies of tool steel or steel suitable for die plates are extremely limited. It has heretofore been necessary in such times, therefore, because of the inability to obtain steel in sufficient quantities, to use individual die buttons similar to those shown in my U. S. Patent No. 1,964,752, granted July 3, 1934, or in my U. S. Patent No. 2,410,372 above-mentioned (Fig. 13). The cost involved in the production of these individual die elements and of the plate which must hold them, is, however, considerable.

Aside from the difficulties of obtaining the required steel for producing large sheet dies, there is, moreover, the disadvantage that such a die, if made of a very high grade of tool steel which is non-deforming and non-shrinking, will be of excessively high cost, while if it is made of a less-costly material, its life will be comparatively limited and moreover it may distort, making it inaccurate. Heretofore, these two balancing factors have influenced the manufacture of large sheet dies.

One object of the present invention is to provide a perforating die, which can be produced very cheaply, and a method of manufacturing the same.

Another object of the invention is to produce a perforating die which is more versatile than die buttons, and more adaptable for emergency production of short-run parts.

Another object of this invention is to provide a perforating die having long-life characteristics but suitable for fast production in an emergency, and which will not require any large amount of strategic or difficult to obtain alloy steels.

Another object of the invention is to provide a perforating die in which small sheet metal or like thin die elements may be employed that are adapted to be inserted rapidly into the die holder in which they are to be used.

A further object of the invention is to provide a die element which is self-aligned and fixed to its holder by the action of the punch in passing therethrough in a perforating operation.

Another object of the invention is to provide a die element which may be seated and attached to the die holder in the punching operation itself without the application of any fastening means.

A further object of the invention is to provide a die element which may be made by perforating rather than by costly drilling and grinding procedures.

A further object of the invention is to provide a method of preparing the die aperture in the die element whereby hardness may be imparted to the working surface of the die element without the necessity for using large percentages of alloys in the element and of heat-treating it.

A still further object of the invention is to provide a method of manufacturing a die element such that surface irregularities in the element will occur in the direction of travel of the slugs, that are pierced from the work-pieces in the punching operation, rather than transversely thereof as is the case when die elements are made with other methods of fabrication, such as by drilling or grinding.

Other objects of the invention will be apparent hereinafter from the specification and from the recital of the appended claims.

In the drawings:

Fig. 13 is a view of a conventional form of punch holder, parts being broken away and shown in section, and illustrating a preparatory step in punching and pinning by the process of the present invention a die plate to the base of the punch holder;

Fig. 14 is a fragmentary sectional view illustrating the completion of the punching and pinning operation; and Fig. 15 is a fragmentary section on a greatly enlarged scale of the bore of a die made according to the present invention, showing how the material adjacent the wall of the bore or hole in the die is hardened by the punching operation, to provide a stronger die surface as well as to provide longitudinal lines of irregularity which the slug contour will follow.

Figure 1:
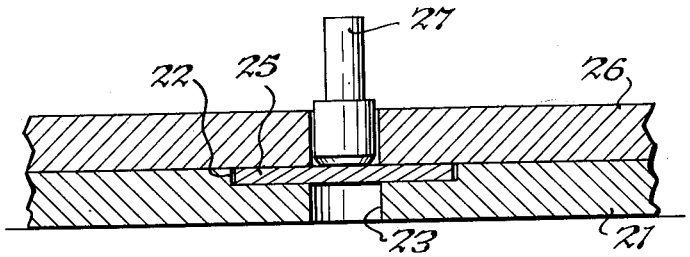
Fig. 1 is a fragmentary vertical section showing a first step in the fabrication of a die element according to one embodiment of the present invention, and illustrating a chamfered end punch about to punch a small insert, tool steel, die disc into a die holder made of less-costly material.
Figure 2:
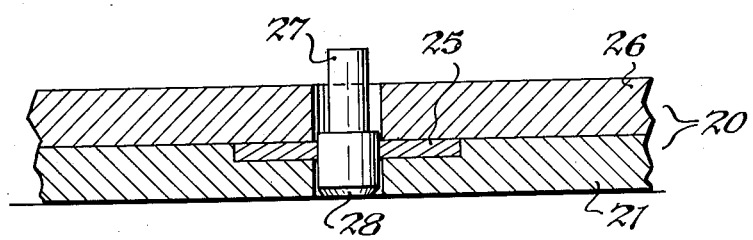
Fig. 2 is a similar section showing the punch driven through the die insert thereby swedging the insert into the die plate holder.

Referring now to the drawings by numerals of reference, and first to the embodiment of the invention illustrated in Figs. 1 and 2, 21 denotes a die holder plate made, for instance, of a low-alloy steel. This plate is provided on its upper face with a circular counter bore 22. It has a hole 23 extending therethrough, which is coaxial with the counterbore and which provides an opening through which a slug may be discharged in a punching operation.

The die element itself comprises a tool steel disc 25, which is slightly smaller in diameter than the diameter of the counterbore 22 and which actually has a slip-fit in the counterbore 22. In fabricating a die according to the present invention, the disc 25 is placed in the counterbore 22, as shown in Fig. 1. Then a guide plate 26 carrying a conventional transfer punch 27 is placed on top of the die plate 21 so that the punch 27 is axially aligned in conventional manner with the hole 23 in the die plate 21; and a punching operation is effected to drive the punch 27 through the die element 25.

As the punch, which has a chamfered front end 28, perforates the die element, it simultaneously swedges the die element outwardly causing it to tightly seize the wall of the counter bore 22 of the die plate, as shown in Fig. 2. When the diameters of the counter bore 22 of the die plate 21 and of the die element 25 are properly chosen the die element 25 will be firmly secured in the die plate 21 after the punching operation and will be fixedly retained in the die plate during normal perforating applications. The composite die 25—21 can be used therefore in a punching operation such as illustrated in my Patent No. 2,410,372 above mentioned.

The slug clearance hole 23 is larger in diameter than punch 27. The die element 25 can be removed when desired, as when dull, then, by application of pressure through the slug clearance hole 23.

Figure 3:
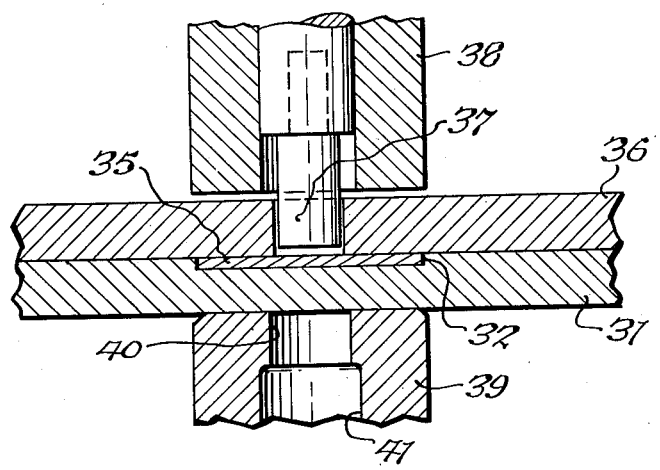
Fig. 3 is a section, similar to Fig. 1, illustrating a modification of the invention in which the die is fabricated by placing a small insert in a low alloy plate and then placing the whole assemblage of die plate, insert, and a guide plate for the punch, over a single die, and punching through the insert and die plate.
Figure 4:
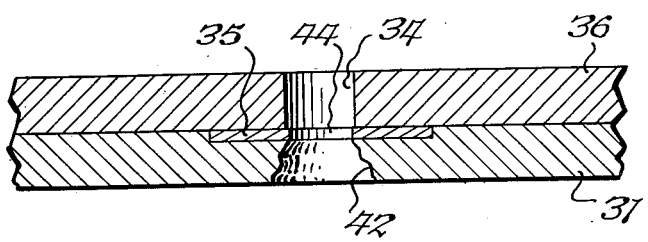
Fig. 4 is a section similar to Fig. 2 but showing the assemblage of Fig. 3, after the punch has been driven through the insert and die plate, the view showing further how through the fabricating method illustrated in Fig. 3 a hardened accurate die is backed and supported by a low alloy supporting material.

Referring now to Fig. 3 the principle of the invention is shown as applied to the fabrication of a die by perforating a die insert and a die holder plate simultaneously through a guide plate. In this case the die holder is denoted at 31. It may be made of a low-alloy steel or other suitable readily-procurable material. It is provided with a counterbore or recess 32 on its upper face in which there is mounted a tool steel, die element 35.

In the operation of fabricating the die, a guide plate 36, having a guide aperture 34 therein, is mounted on top of the die element, and the assemblage is placed in a standard perforating apparatus such as any conventional single-hole perforating apparatus. Such apparatus may comprise a punch 37, a punch holding guide 38 and a die 39. The die 39 has a die aperture 40 and an axially-aligned slug clearance hole 41 which is of larger diameter than the die aperture. When the punch 37 is actuated the die hole 44 is punched in the die element 35, and simultaneously the die element 35 is swedged outwardly to bind it to the die plate 31, and simultaneously the punch automatically provides slug clearance in the holder 31 by tearing out the relatively soft die plate 31 in normal fashion, providing a jagged punched hole 42 as shown. This action provides a die comprising a hardened steel die insert 35, which is perforated to size and which has a die hole finish and hardness of superior quality, and a holder 31 for the insert 35 and having a slug clearance hole 42.

It is important to note that the thickness of the die element 35 is less than twenty percent of the thickness of the material of the die holder plate. This assures that the jagged slug clearance hole 42 will be in the soft supporting plate 31. It also assures that the die plate will have a completely straight walled hole 44 without any jagged surfaces which might cause failure because of stress on the die when used in production. The jagged section in all cases is in the die holder plate 31 which is made of low strength material not subject to fatigue failures from the action of the punch thereon.

Figure 5:
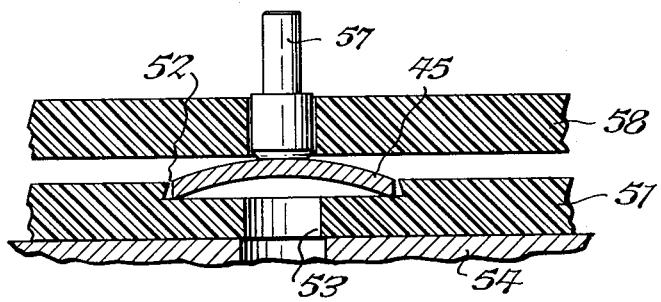
Fig. 5 is a section similar to Fig. 1 showing the set-up for manufacturing a die from a slightly convex sheet metal tool steel die element and a non-metallic die supporting plate.
Figure 6:
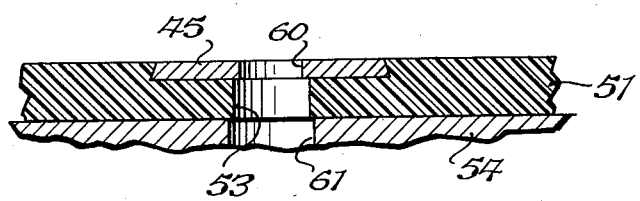
Fig. 6 shows the finished die, illustrating how the convex sheet metal die element is flattened out and swaged into the die holder by the punch in its perforating stroke.

Figs. 5 and 6 illustrate a further modification of the invention in which the die element, that is used, is in its normal state a crowned or convex disc having a beveled periphery. In this case, the tool steel die element which is denoted at 45, is to be mounted in a die holder 51 made, for instance, of plastic material such as used for temporary tooling.

The die holder 51 is provided with a recess or counterbore 52 and with a bore 53 for slug clearance. The counterbore 52 is undercut to conform to the bevel of the peripheral surface of die element 45. Preferably the die holder 51 is mounted upon a supporting plate 54 for strength. This plate has a hole therein, which is axially aligned with, but of larger diameter than hole 53.

As in the modification of the invention illustrated in Figs. 1 and 2, the die element 45 is simultaneously perforated and swedged into the counter bore 52 by a conventional transfer punch 57 which has a chamfered front face and which may be carried in a plastic guide plate 58. Here, due to its convexity, die element 45 has a sharp edge on its lower face around its periphery, which, when the element is flattened, digs into the plastic plate 51. The sharp edge of the die element in this case serves to more firmly anchor the die within the holder 51.

Fig. 6 shows the completed die, the hole 60 in the die element being formed by the punch simultaneously with the swedging of the die element in the plastic holder. The supporting plate 54 has, as stated, a slug clearance hole 61; and this aligns with the hole 53 in the die plate 51 and the die perforation 60.

Figure 7:
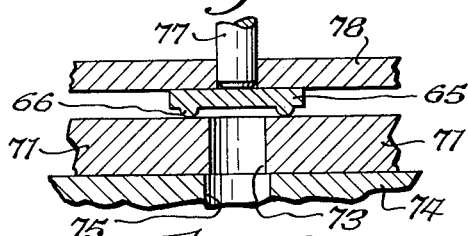
Fig. 7 illustrates a further modification of the invention in which a small sheet metal, tool steel, die element is simultaneously perforated and spot welded to a less-costly main die plate.
Figure 8:
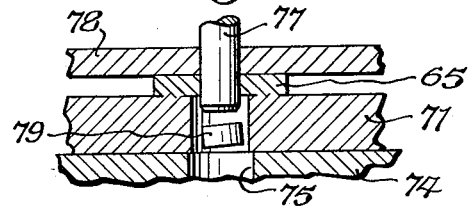
Fig. 8 shows the finished die after the spot welding has taken place.

Figs. 7 and 8 show a further embodiment of the invention in which the die element is a tool steel disc 65 having teats 66 on its under surface. Here, the die holder is a plate 71 made of low-alloy steel or the like. Plate 71 has a hole 73 in it for slug clearance. It is mounted, in turn, upon a base plate 74 which also has a slug clearance hole 75 therethrough axially aligned with hole 73.

In fabricating the die, a conventional transfer punch 77, mounted in a guide plate 78, is driven by the operation of the ram (not shown) of the punching press through the die element 65 perforating the die element and simultaneously welding the die element to the plate 71, as shown in Fig. 8, the teats 66 of the die element being driven into the plate 71 by the pressure of the guide plate 78 on the die element 65 on the downward operating stroke of the ram of the perforating machine. The slug cut out of the die element by the punch 77 in this operation is denoted at 79. It drops through the holes 73 and 75.

Figure 9:
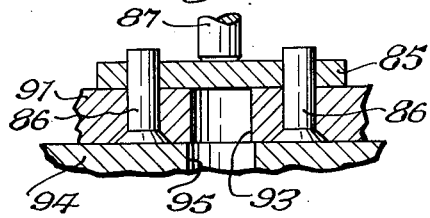
Fig. 9 is a section illustrating a die insert about to be perforated and riveted to its holder in a simultaneous operation.
Figure 10:
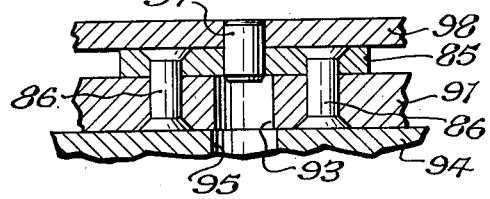
Fig. 10 illustrates the die after riveting and perforating has been effected.

A still further embodiment of the invention is illustrated in Figs. 9 and 10. Here the tool steel die element is denoted at 85. It is adapted to be riveted by rivets 86 to the low-alloy die plate 91 which is supported by the base plate 94. The die plate has a hole 93 in it for slug clearance which aligns with the clearance hole 95 in the plate 94. Again the perforation of the die element and the securing of the die element to the die holder is effected by use of a standard transfer punch that is held in a guide plate 98. These rivets, which are headed at their lower ends, are first inserted in aligned holes in plate 91 and die element 85 to have their upper ends projecting above die element 85 as shown in Fig. 9. The punch is then driven by the ram (not shown) of the punching press through the die element 85 to perforate the same while the pressure of the ram on the guide plate 98 heads up the rivets 86 fixing the die element to plate 91.

Figure 11:
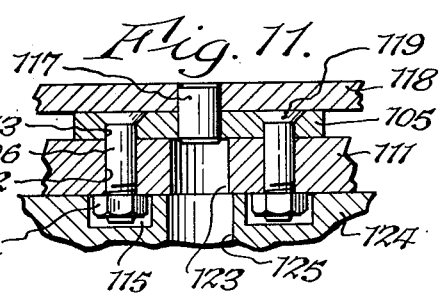
Fig. 11 illustrates a further modification of the invention, showing a punch and its guide-plate at the end of the working stroke of the ram of the perforating machine, and illustrating a bolted type of die plate in which the bolt heads are formed simultaneously with perforation of the die element.

A still further embodiment of the invention is illustrated in Fig. 11. Here, the tool steel die element is denoted at 105 and its low-alloy supporting plate at 111. Here the die element is adapted to be secured to the supporting plate by bolts 106. The unheaded bolts 106 are first passed up through holes 112 in the plate 111 and through aligned holes 113 in the die element 105. Nuts 114 are then threaded on the lower ends of these bolts to fasten them in holder 111. The holder 111 is then placed on base plate 124 with the lower ends of the bolts and the nuts 114 received in the recesses 115 in the supporting plate 124. As before, a transfer punch 117 carried in a transfer plate 118 is then placed on top of die element 115 and is driven by the ram of the perforating machine through the die element 105 to perforate the same while simultaneously the pressure of the ram on the plate 117 causes the plate 117 to form the heads 119 of the bolts. Plate 111 has a slug clearance hole 123 in it and plate 124 has an axially-aligned slug clearance hole 125. Both holes are larger than punch 117 and, therefore, larger than the die hole formed in die element 105 by the punch.

Figure 12:
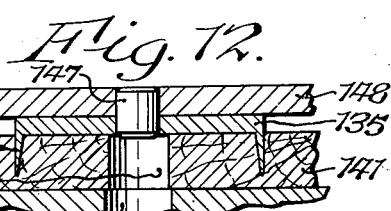
Fig. 12 shows a further modification of the invention in which a sheet metal, tool steel die element is simultaneously impressed into its holder and perforated.

A still further embodiment of the invention is shown in Fig. 12. Here the die element is a tool steel plate 135 having staples 136 integral therewith. The die holder 141 is here made of wood and is mounted upon a supporting plate 144. It has a central hole 143 through it aligned with the hole 145 in the support 144 for slug clearance. As before the simultaneous perforation of the die element and fastening of this die element to the die holder is effected by a transfer punch 147 mounted in a transfer plate 158. The punch is driven by the ram of the perforating machine through the die element 135 to perforate the same while simultaneously the pressure of the ram on guide plate 148 forces the brads or staples 136 of the die element into the wooden holder 141 to securely fasten the die element to the holder.

Figs. 13 and 14 show a further modification of the invention in which a die plate or element 155 of tool steel is secured to the base or anvil portion 161 of a conventional punch holder 164. Mounted in the upper arm 166 of this punch holder is a punch 167 carrying a punch element 168 which is chamfered on its front face. Mounted in parallel holes in the arm 166 are cylindrical guide blocks 169. These guide blocks are bored to hold dowel pins 176; and drivers 170 and 171 are mounted reciprocably in these bores. The guide blocks 169 may be made of nylon or any similar material. The anvil 161 of the punch holder is provided with holes 172 and 173 aligning respectively with the drive members 170 and 171. It is also provided with a slug clearance hole 175 that is in alignment at its upper end with punch element 168. When the ram of the punch press strikes the enlarged upper ends of the drive members 170 and 171 and of the punch 167, the punch element 168 is driven by the ram 179 of the machine through the die plate 155 to perforate the same and simultaneously the drive members 170 and 171 under actuation of the ram drive the hardened dowel pins 176 through the die plate to fasten the die plate to the anvil portion 161 of the punch holder. The holes 172 and 173 in punch holder 164 are approximately the same diameters as dowel pins 176. The slug clearance hole 175 is of considerably larger diameter, however, than punch element 168. Slugs 174 produced by the dowel pins 176 wedge, therefore, into the holes 172 and 173, while the slug 178 produced by punch element 168 falls away through clearance hole 175. The dowel pins 176 themselves secure the die element 155 to the anvil 161, the stroke of the ram 177 being such as to drive them into the punch holder without driving them through plate 155. After the die element has been fastened to the die holder by pins 176, drive members 170 and 171 may be removed from the punch holder, and the punch holder may be used in conventional manner for perforating operations.

Fig. 15 shows on a greatly enlarged scale a fragmentary axial section of a die element made according to the present invention. The line 180 denotes the bounding wall of the aperture in the die element. It will be noted that in the punching operation the material of the die element is squeezed radially outwardly and compacted. The die hole wall 180 is thereby left smooth; and a stronger die surface is provided. The die holder plate, moreover, provides sufficient clearance for the slug as it is forced through the die aperture. In each case it will be seen that the hardened steel die insert is perforated to size and that the die hole is finished and has a hardness of superior quality. In each case, too, it will be seen that a die element made as required, of tool steel is provided, but that the holder for that element can be made of cheaper, more readily procurable material.

While the invention has been described in connection with several different embodiments thereof, it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The method of manufacturing a perforating die which comprises seating a die element made of a hard material in a counterbore in a die holder that is made of a softer material, said holder having a slug-clearance hole aligned with said counterbore, and driving a perforating punch through said die element to form the die aperture in said die element and simultaneously to exert pressure laterally outwardly on said die element, said counterbore being of slightly larger area than said die element but being close enough in area to the area of said die element so that said lateral outward pressure will force the outer peripheral wall of said die element into binding engagement with the opposed inside wall of said counterbore, thereby to affix said die element to said holder.

2. The method of manufacturing a perforating die which comprises seating a die element made of one material in a counterbore in a die holder that is made of another material, said holder having a slug-clearance hole aligned with said counterbore, positioning a perforating punch, that has a chamfered front face and that is slightly smaller in diameter than said slug clearance hole, in axial alignment with said slug clearance hole, and forcing said punch through said die element while applying pressure against the front face of said die element so that said die element is simultaneously perforated and expanded laterally outwardly by the perforating pressure, said counterbore being of slightly larger area than said die element but being close enough in area to the area of said die element so that said outward lateral pressure will force the outer peripheral wall of said die element into binding engagement with the opposed inside wall of said counterbore to affix said die element to said holder.

3. The method of manufacturing a perforating die which comprises seating a die element made of one material in a counterbore in a die holder that is made of another material, said holder having a slug-clearance hole aligned with said counterbore, and driving a perforating punch through said die element while holding the outer face of said die element, whereby to simultaneously provide a die aperture in said die element and to swedge said die element laterally outwardly, said counterbore being of slightly larger area than said die element but being close enough in area to the area of said die element so that the outward lateral pressure will force the outer peripheral wall of said die element into binding engagement with the opposed inside wall of said counterbore to affix said die element to said holder.

4. The method of manufacturing a perforating die which comprises seating a die element made of one material in a counterbore in a die holder that is made of another material, said counterbore being of slightly larger area than said die element but being close enough in area to said die element that lateral outward expansion of said die element in said counterbore will affix said die element in said counterbore, and said holder having a slug-clearance hole aligned with said counterbore, placing a guide-plate, that carries a perforating punch, on said die element and holder with the punch axially-aligned with said hole, and forcing said punch from said guide-plate through said die-element while applying pressure to said guide-plate to hold said die element in said counterbore and while simultaneously expanding said die element laterally outwardly, whereby to simultaneously provide a die aperture in said die element and affix said die element to said holder.

5. The method of manufacturing a perforating die which comprises seating a die element made of a hard material in a counterbore in a die holder that is made of a softer material, driving a perforating punch through said die element to form a die aperture in said die element and to expand said die element laterally outwardly simultaneously, said counterbore being of slightly larger area than said die element but being close enough in area to the area of said die element so that the lateral outward pressure will force the outer peripheral wall of said die element into binding engagement with the opposed inside wall of said counterbore to affix said die element to said holder.

6. The method of manufacturing a perforating die which comprises seating a die element made of one material in a counterbore in a die holder that is made of another material, placing a guide-plate that carries a perforating punch on said die element and holder, and forcing said punch from said guide-plate through said die element while applying pressure to said guide-plate to hold said die element in said counterbore, whereby to simultaneously provide a die aperture in said die element and to expand said die element laterally outwardly, said counterbore being of slightly larger area than said die element but being close enough in area to the area of said die element so that said lateral outward expansion will force the outer peripheral wall of said die element into binding engagement with the opposed inside wall of said counterbore to affix said die element to said holder.

7. The method of manufacturing a perforating die which comprises seating a die element made of a hard material in a counterbore in a die holder that is made of a softer material, positioning said die element and holder between a perforating punch and a perforating die, and driving said punch through said die element and holder to simultaneously provide a die aperture in said die element, a slug-clearance hole in said holder, and to swedge said die element laterally outwardly, said counterbore being of slightly larger area than said die element but being close enough in area to the area of said die element so that the lateral outward pressure will force the outer peripheral wall of said die element into binding engagement with the opposed inside wall of said counterbore to affix said die element to said holder.

8. The method of manufacturing a perforating die which comprises seating a die element made of one material in a counterbore in a die holder that is made of another material, placing a guide-plate that carries a perforating punch on said die element and holder, positioning said die element, holder and plate on a perforating die with the perforating die aligned axially with said punch, and forcing said punch from said guide-plate through said die element and holder while applying pressure to said guide-plate to hold said die element in said counterbore, whereby to provide a die aperture in said die element, a slug-clearance hole in said holder and to expand said die element laterally outwardly, said counterbore being of slightly larger area than said die element but being close enough in area to the area of said die element so that said lateral outward expansion will force the outer peripheral wall of said die element into binding engagement with the opposed inside wall of said counterbore, thereby to affix said die element to said holder.

9. The method of manufacturing a perforating die which comprises placing a die element in the form of a convex disc in a counterbore in a die holder that is made of another material, and driving a punch through said die element while simultaneously applying pressure to said die element, whereby to provide a die aperture in said die element and simultaneously to expand said die element laterally outwardly to force its peripheral wall into binding engagement with the opposed inside wall of said counterbore, thereby to affix said die element to said holder.

10. The method of manufacturing a perforating die which comprises placing a die element in the form of a convex disc in a counterbore in a die holder that is made of another material, said holder having a slug-clearance hole aligned with said counterbore, placing a guide-plate, that carries a perforating punch, on said die element and holder, with said punch aligned axially with said hole, and while applying pressure through said plate to said die element to flatten said die element in said counterbore, driving said punch from said plate through said die element to simultaneously provide said die element with a die aperture and to expand said die element laterally outwardly to force its peripheral wall into binding engagement with the opposed inside wall of said counterbore, thereby to affix said die element to said holder.

References Cited in the file of this patent

UNITED STATES PATENTS

| 522,953 | Bradley | July 10, 1894 |
| 991,498 | Garvey | May 9, 1911 |
| 1,058,210 | Welch | Apr. 8, 1913 |
| 1,325,194 | Geist | Dec. 16, 1919 |
| 1,675,910 | Riker | July 3, 1928 |
| 1,801,006 | Jacoby | Apr. 14, 1931 |
| 1,905,653 | Schranz | Apr. 25, 1933 |
| 1,928,836 | Loughead | Oct. 3, 1933 |
| 2,323,949 | Vosburg | July 13, 1943 |
| 2,332,360 | Wakefield | Oct. 19, 1943 |
| 2,378,562 | Lahr | June 19, 1945 |
| 2,410,372 | Wales | Oct. 29, 1946 |
| 2,533,922 | Deichmiller et al. | Dec. 12, 1950 |
| 2,553,615 | Wales | May 22, 1951 |